United States Patent [19]

Toporkiewicz

[11] Patent Number: 4,966,454
[45] Date of Patent: Oct. 30, 1990

[54] 3-D MOTION PICTURE PROJECTOR

[75] Inventor: Marian Toporkiewicz, Toronto, Canada

[73] Assignee: Imax Systems Corporation, Canada

[21] Appl. No.: 404,472

[22] Filed: Sep. 8, 1989

[51] Int. Cl.⁵ .............................................. G03B 35/00
[52] U.S. Cl. ....................................... 352/59; 352/184
[58] Field of Search ....................... 352/57, 59, 69, 184

[56] References Cited

U.S. PATENT DOCUMENTS

| 3,600,073 | 8/1971 | Shaw | 352/184 |
| 4,114,996 | 9/1978 | Shaw | 352/184 |
| 4,441,796 | 4/1984 | Shaw | 352/184 |

OTHER PUBLICATIONS

"Future Cinema", Perforations, vol. 4, No. 3, 1984, p. 34 by Collin Low.
"Large Screen 3-D—Aesthetic and Technical Considerations", by Colin Low, Perforations, vol. 3, No. 4, 7-1983, p. 44.
"3-D Imax Camera Assembly", by Len Green, Perforations, vol. 4, No. 4, 1984.
"3-D Imax Progress Report", by Marcel Malacket Perforations, vol. 4, No. 4, 1984.

Primary Examiner—Monroe H. Hayes

[57] ABSTRACT

A 3-D motion picture projector comprises two rolling loop film transport mechanisms arranged in vertically superposed relationship with the pricipal components of the two mechanisms in vertical alignment with one another. Each film transport mechanism includes a cam unit for decelerating the film as it approaches the aperture for projection. The two cam units are driven from a common vertical drive shaft by toothed belt drives. The lower cam unit is mounted on an arm so that it can be swung out to an inoperative position for maintenance and service. The belt drives maintain the drive coupling at this time and automatically restore proper cam timing when the cam unit is returned to its operative position.

10 Claims, 4 Drawing Sheets

3-D MOTION PICTURE PROJECTOR

FIELD OF THE INVENTION

This invention relates generally to a projector for stereoscopic or three-dimensional motion pictures (hereafter called 3-D motion pictures).

BACKGROUND OF THE INVENTION

3-D motion pictures are generally made by simultaneously photographing a subject using two motion picture cameras positioned to provide left and right eye views of the subject. To present the motion picture, the images recorded by the cameras are simultaneously projected onto a screen from two projectors and are optically coded in some way so that the left eye of a viewer sees only the images that were recorded by the "left eye" camera while the viewer's right eye sees only the "right eye" images. The viewer then perceives a stereoscopic or 3-D effect.

Coding of the images may be effected by the use of what are in effect shuttered spectacles worn by a viewer. The shutters effectively block and unblock the view from each eye alternately in timed relation to projection of the images onto the screen so that the viewer's right eye is blocked when left eye images appear and vice versa. This technique is referred to as "alternate eye" 3-D and is discussed, for example, in U.S. Pat. No. 4,424,529 (Roese et al.). Another technique involves the use of oppositely polarized filters on the projection lenses for the respective images and correspondingly polarized filters in glasses worn by a viewer.

Spectacular 3-D motion pictures can be made using large format films such as those that are available from Imax Systems Corporation of Toronto, Canada under the registered trade marks IMAX and OMNIMAX. The use of large format films has become possible as a result of development of the so-called "rolling loop" film transport mechanism for cameras and projectors. U.S. Pat. No. 3,494,524 to Jones discloses the principle of a rolling loop transport mechanism. A number of improvements in the original Jones mechanism are disclosed in U.S. Pat. Nos. 3,600,073, 4,365,877 and 4,441,796 (Shaw). All of these patents have been assigned to Imax Systems Corporation.

BRIEF DESCRIPTION OF THE INVENTION

An object of the present invention is to provide an improved rolling loop projector which is capable of projecting two series of images for achieving 3-D image presentation.

The projector is designed to project corresponding series of "left eye" and "right eye" images from respective film strips and includes two rolling loop film transport mechanisms, one for each film strip. Each mechanism includes stator means having an aperture, a rotor co-operating with the stator means to define a film passage, the rotor having gaps for receiving film loops and being rotatable with respect to the stator means, means for moving the relevant film strip through the film passage, and means for locating the film strip in registration with the aperture. The mechanism also includes film deceleration means in the form of a cam unit having means for releasably engaging the film strip to decelerate the strip for engagement with the film locating means, the cam unit having a vertical rotational axis. The two rolling loop film transport mechanisms are located in vertically superposed relationship with the rotors rotatable about a common vertical axis. The projector also includes means for projecting light through each of the apertures and a projection lens assembly in association with each aperture.

In one embodiment, support means is provided for the lower one of the two cam units and permits the unit to move between an operative position for decelerating film in the lower of the two rolling loop film transport mechanisms, and an inoperative position in which the lower cam unit is clear of the upper cam unit for permitting access to the lower unit.

Preferably, the cam units are driven by drive means including a rotary drive shaft which has a vertical axis and which is located parallel to the rotational axes of the cam units and outwardly of the stator means of the respective rolling loop mechanisms. The drive shaft is coupled to the respective cam units so that the units are driven from the shaft. The support means for the lower cam unit can then be pivotally mounted on the cam unit drive shaft so that the lower cam unit can be swung outwardly about this shaft from its operative position to its inoperative position. Means is provided for locking the lower cam unit in its operative position for operation of the projector.

In another embodiment particularly adapted for "alternate eye" 3-D, the two rotors of the rolling loop mechanisms are offset from one another to an extent sufficient to achieve alternate projection of the images from the respective film strips.

In summary, the invention provides a single projector having two superposed rolling loop transport mechanisms, for projecting stereoscopic images from two film strips transported through the respective mechanisms. By superposing two film transport mechanisms, the respective projection lenses can be positioned close to one another for achieving good 3-D image co-incidence on the projection screen. Also, common drive arrangements can be used for many of the components of the two mechanism. At the same time, the support arrangement for the lower one of the two cam units provided in one embodiment allows unobstructed access to both units for adjustment, maintenance and service of both cam units.

By mounting the lower cam unit support means on the cam unit drive shaft, the drive couplings between the two cam units in the drive shaft are maintained, even when the lower cam unit is moved to its inoperative position. The cam unit timing is shifted during this movement but the timing returns to its initial setting once the cam unit is returned to its operative position. Preferably, toothed belt drive couplings are used between the drive shaft and the two cam units.

BRIEF DESCRIPTION OF THE DRAWINGS

In order that the invention may be more clearly understood, reference will now be made to the accompanying drawings which illustrate a particular preferred embodiment of the invention by way of example, and in which:

in FIG. 2, the cam units are shown in their operative positions while in FIG. 3, the lower cam unit is shown in its inoperative position, for example for maintenance or servicing;

DESCRIPTION OF PREFERRED EMBODIMENT

Figure 1:
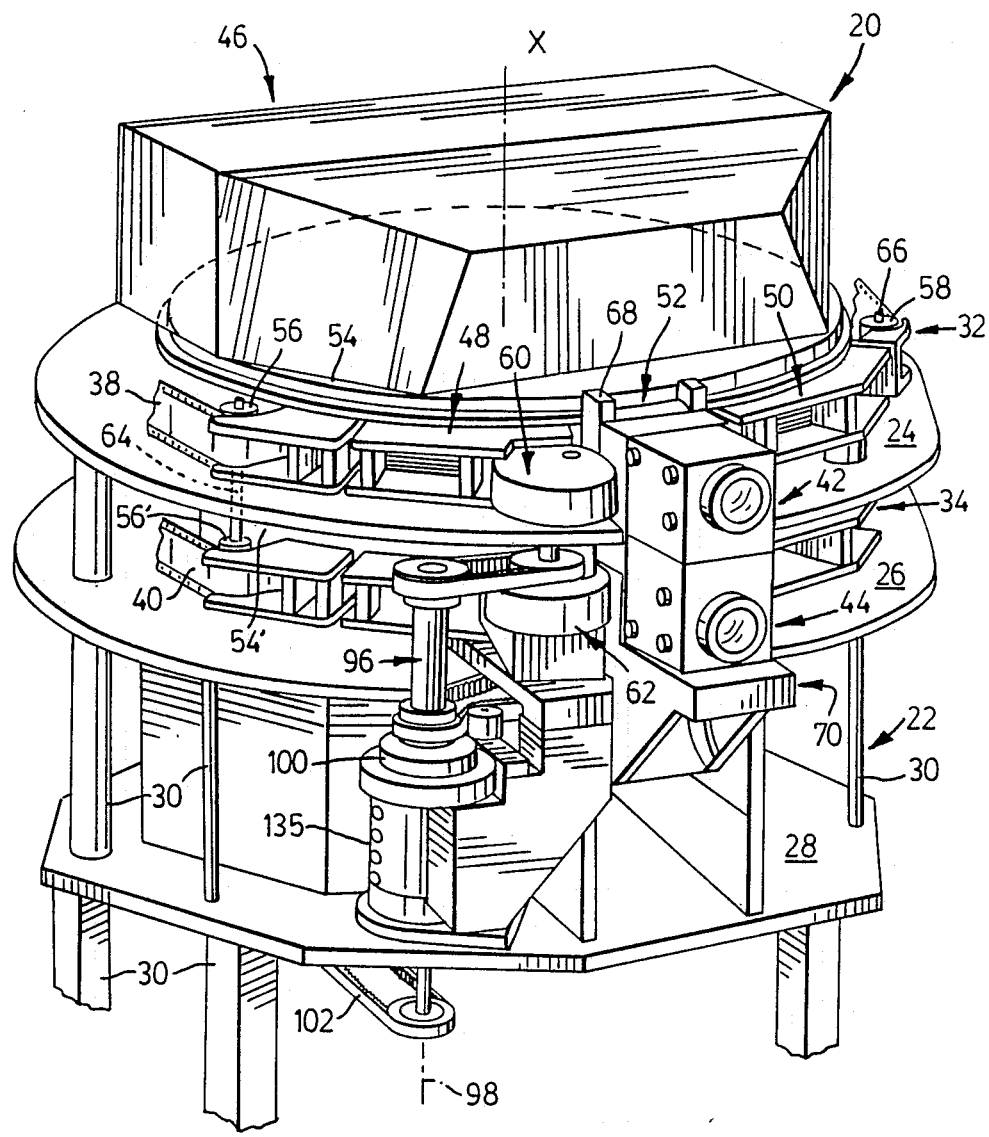
FIG. 1 is a somewhat simplified perspective view showing the principal components of a 3-D motion picture projector in accordance with the invention.

Referring first to FIG. 1, the projector is generally designated by reference numeral 20 and has frame 22 which includes three horizontally disposed baseplates 24, 26 and 28 supported in vertically spaced positions by various legs 30. Baseplates 24 and 26 support respective upper and lower rolling loop transport mechanisms that are generally indicated at 32 and 34 respectively. Parts of respective film strips to be transported by the mechanisms are indicated at 38 and 40. Corresponding projection lenses are indicated at 42 and 44, while a common lamphouse containing projection lamps, mirrors and associated lenses is generally indicated at 46.

The drawings show only the principal components of the respective rolling loop mechanisms that are necessary for an understanding of the present invention. Reference may be made to the Shaw '073 patent (supra) for a fuller description of the rolling loop film transport mechanism. The two mechanisms 32 and 34 of projector 20 are each essentially the same as the mechanism disclosed in the Shaw patent, except for the features described specifically herein. The disclosure of the Shaw patent is incorporated herein by reference.

FIG. 1 shows that the rolling loop mechanism 32 includes stator means made up of an inlet stator assembly 48 and outlet stator assembly 50 with an aperture plate 52 between the two stator assemblies. Part of a rotor of the mechanism is visible at 54. The rotor cooperates with the stator to define a film passage, and has gaps for receiving film loops, all as described in the Shaw patent. Rotor 54 is supported for rotation about a vertical axis indicated at X in FIG. 1.

Mechanism 32 also includes means for moving film strip 38 through the passage between the rotor and stator, in the form of driven inlet and outlet sprockets 56 and 58 respectively. As will be described in more detail later with particular reference to FIG. 5, mechanism 32 also includes means for locating the film strip in registration with the aperture in aperture plate 52, in the form of fixed film registration pins that are located adjacent the film projection aperture for engagement in the marginal perforations typically provided in motion picture film.

In accordance with the teaching of the Shaw patent, the film is decelerated as it is located on these registration pins, by a cam unit immediately adjacent to and upstream of the aperture plate 52. The cam unit of mechanism 32 is generally indicated at 60 in FIG. 1.

The lower rolling loop transport mechanism 34 is essentially identical with mechanism 32 except in the area of the film decelerating cam unit for the lower mechanism. That unit is indicated at 62 whereas the other components of mechanism 34 are denoted by primed reference numerals corresponding to the numerals used for the components of mechanism 32. The rotors 54 and 54' of the two mechanisms are identical and are both rotatable about a common vertical axis denoted X.

Where the projector is to be used alternately project "left eye" and "right eye" images as discussed previously, the two rotors will be rotationally offset from one another (see FIG. 1a) to an extent sufficient to cause alternate projection of images from the respective film strips 38 and 40. However, all of the other components of the two mechanisms will be aligned with one another. For example, as can be seen from FIG. 1, the two input sprockets 56 and 56' are aligned and are mounted on a common driven shaft 64. Similarly, the output sprocket 58 and the corresponding sprocket for mechanism 34 (not visible) are mounted on a common drive shaft 66. Although not visible in FIG. 1, the two drive shafts 64 and 66 are driven from the main drive motor of the projector so that the sprockets are driven in synchronism with the other components of the projector.

Two separate aperture plates are in fact used for the respective mechanisms but the plates are mounted in a common housing indicated at 68. Similarly, the two projection lenses 42 and 44 are vertically aligned and mounted in a common housing 70.

Figure 1A:
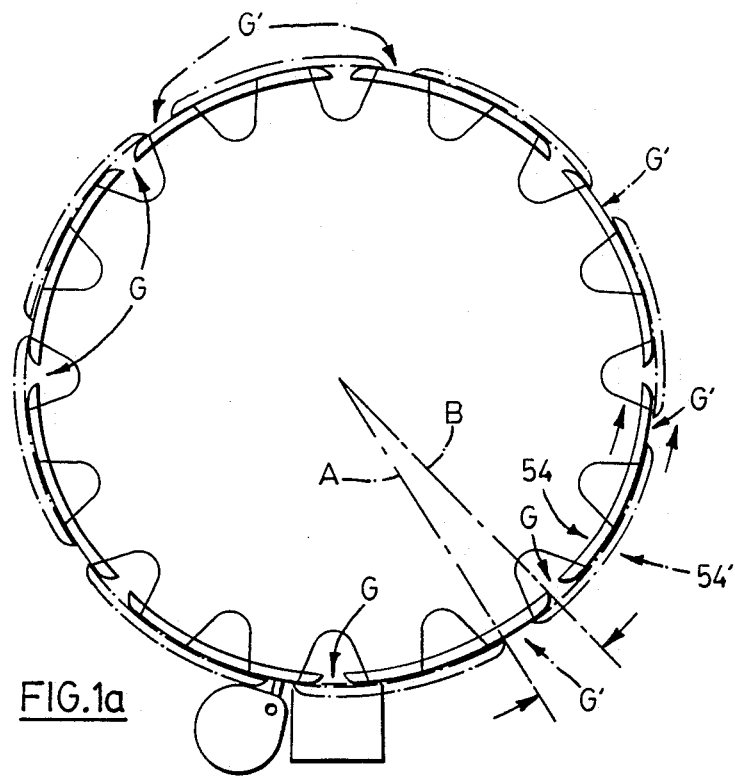
FIG. 1a is a schematic view showing the two rotors of the projector of FIG. 1.

Referring to FIG. 1a, the two rotors 54 and 54' are shown as seen in plan but with the lower rotor 54' shown as being of larger diameter than the upper rotor simply for the purpose of illustrating the rotor offset discussed previously; in fact, the two rotors are of identical diameter. The gaps in the two rotors are denoted respectively by the letters G and G' and the lines denoted A and B indicate the gap offset between the respective rotors. Each of the rotors is provided with a curved plate behind each gap that forms a main shutter, and with a "flicker" shutter midway between each pair of gaps, again as described in Shaw '073 patent. As a result of this shutter configuration, each frame in each film strip is projected twice.

FIG. 1a shows a practical projector in which each rotor has eight gaps and sixteen shutters. In this configuration, the rotor offset necessary to achieve alternate eye projection (with two images being projected twice) is one quarter of the gap spacing. The angular amount of the offset will therefore amount to one quarter of 45° (the angular spacing of the gaps). If no secondary shutters were used, the offset should be one half of the gap spacing. This amount should be further divided by two for each secondary shutter added between each adjacent pair of gaps.

Figure 3:
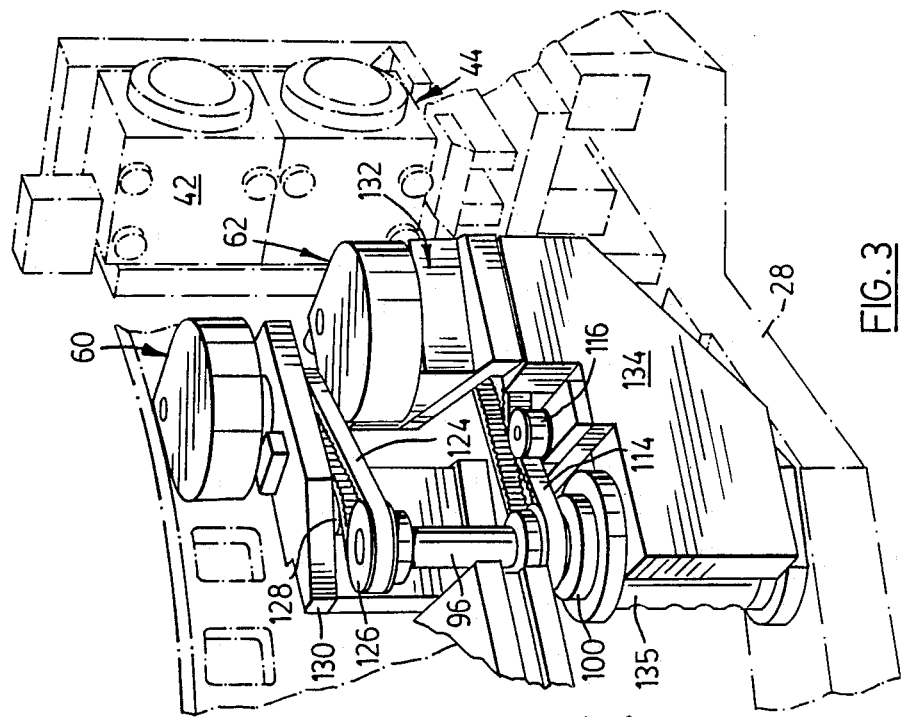
FIGS. 2 and 3 are detail perspective views showing the two cam units of the projector that appear in the foreground of FIG. 1.
Figure 2:
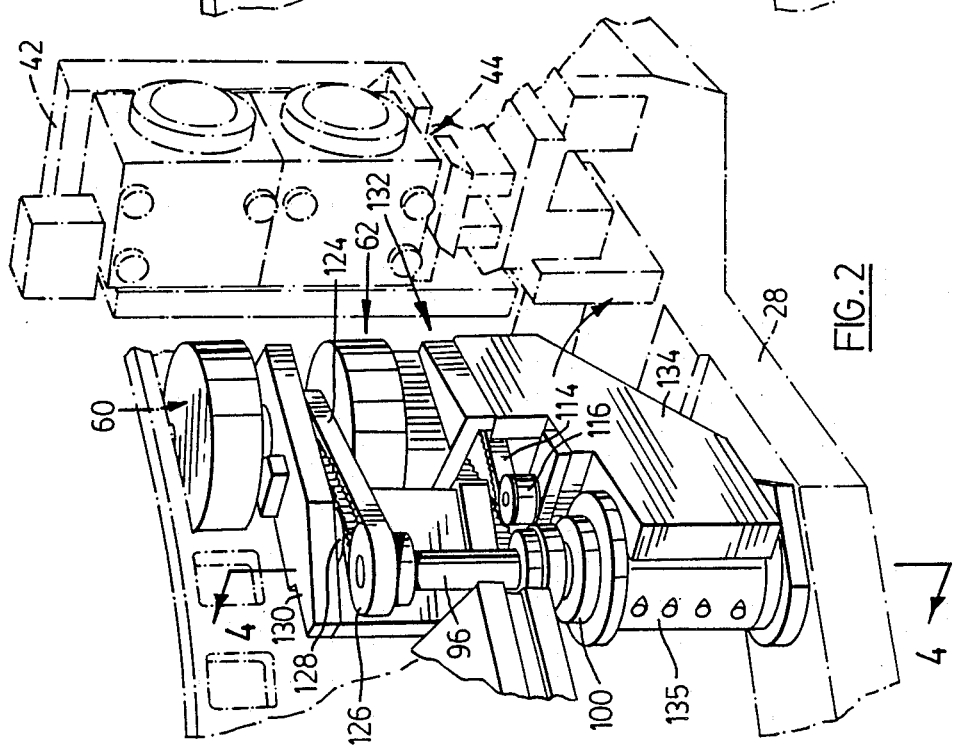

FIGS. 2 and 3 are detail perspective views showing the two cam units 60 and 62 of FIG. 1. The cam units are shown in their operative positions in FIG. 2 while in FIG. 3 the lower cam unit 64 has been shown moved outwardly from its operative position towards an inoperative position for servicing.

The two cam units 60 and 62 themselves are essentially identical and are of the form described in the Shaw '073 patent. For completeness of description, reference will briefly be made to FIG. 5 in describing the components of cam unit 62, as representative of both cam units.

Cam unit 62 has a housing 72 provided with a removable top cover 74. Within housing 72 a cam 76 is mounted on a vertical shaft 78 for rotation about a corresponding vertical axis 80. A cam track 82 in the top face of cam 76 receives a cam follower 84 at the outer end of one limb of a cranked arm 86 that is pivoted to housing 72 at 88. The other limb of arm 86 protrudes outwardly from housing 72 and through the stator of the film transport mechanism into the path of the film travelling through the mechanism. A pair of film engaging pins 90 project outwardly from the relevant end of arm 86 for engagement in marginal perforations in the film.

Figure 5:
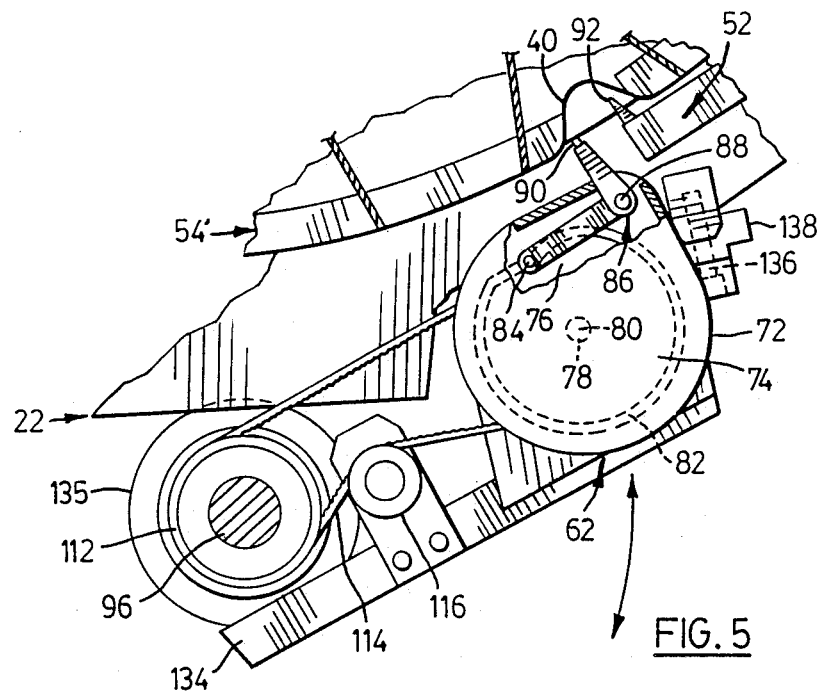
FIG. 5 is a somewhat schematic plan view of the lower cam unit in its operative position.

As is described in detail in the Shaw '073 patent, the cam track 82 is shaped so as to cause the pins 90 to travel in a path in which they engage and decelerate the film for engagement with film locating means in the form of registration pins such as those indicated at 92 in FIG. 5. These pins are located adjacent the aperture plate 52 of the mechanism and the film is decelerated as it engages the pins 92 and is laid onto the aperture plate for projection. Deceleration of the film reduces the severity of impact between the film and the registration pins.

In practice, it is necessary to have access to the cam unit for adjustment purposes and for maintenance and service of the cam and bearing normally provided in cam follower 84.

Referring back to FIG. 1, the two cam units 60 and 62 are driven from a common rotary drive shaft 96 that is rotatable about a vertical axis 98 located parallel to the rotational axes of the respective cam units and outwardly of the stators of the respective film transport mechanisms. It will be seen that shaft 96 is in fact rotationally supported in a housing 100 that is mounted to the lower baseplate 28 of the projected frame. The shaft itself projects below plate 28 and is rotationally driven by a drive belt 102 from the main drive shaft of the projector.

Figure 4:
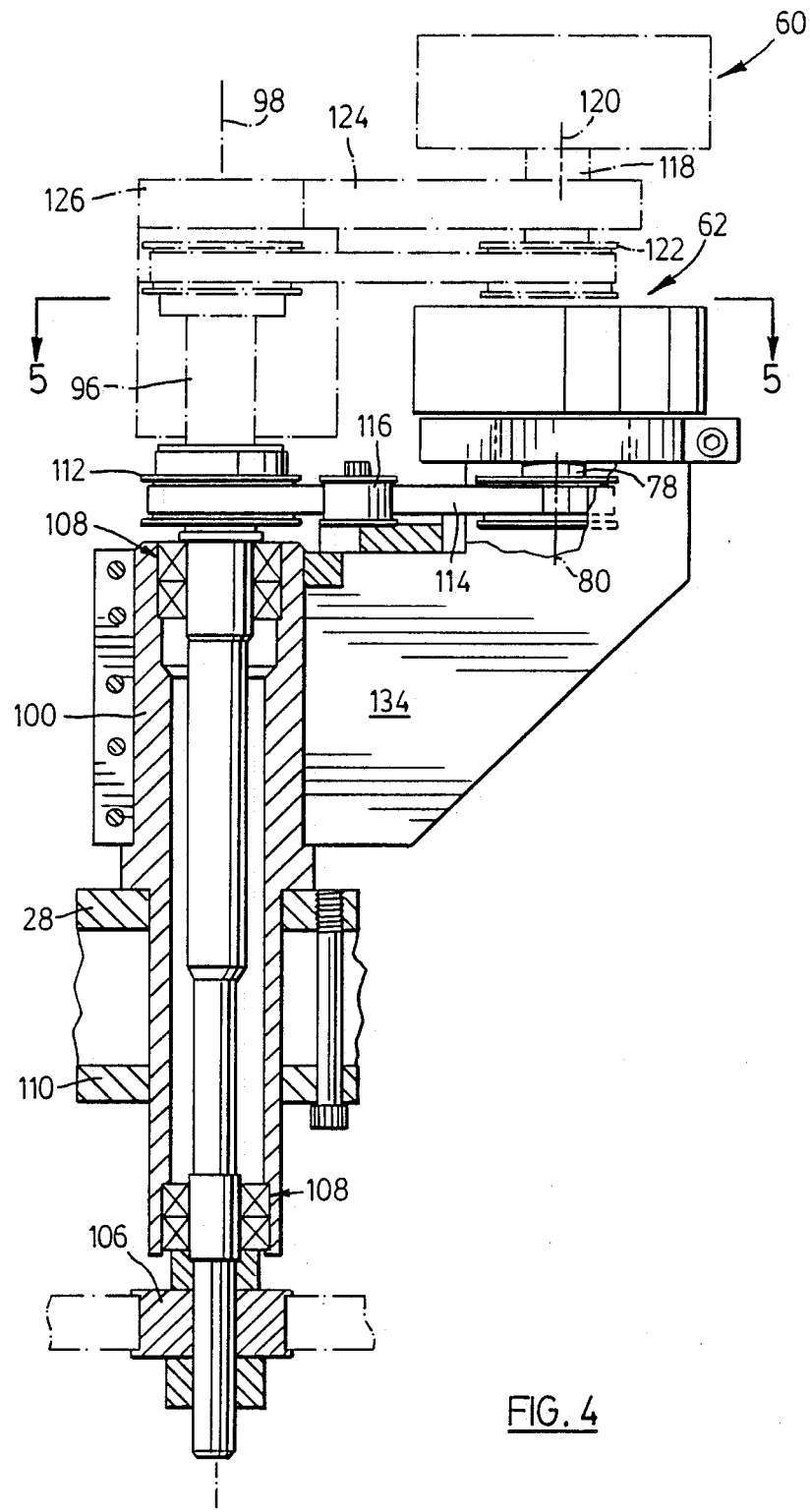
FIG. 4 is a vertical sectional view on line 4—4 of FIG. 2.

FIG. 4 shows the drive shaft 96 and its housing 100 in detail. A driven toothed pulley on the lower end of shaft 96 is visible at 106. The shaft is journaled in its housing by bearings 108. The housing is itself located in an opening in baseplate 28 and in a corresponding lower support plate 110 that is not visible in FIG. 1.

Immediately above the top of housing 100, drive shaft 96 is provided with a toothed pulley 112 that drives the drive shaft 78 of the lower cam unit 62 by means of a belt 114 The rotational axis of shaft 78 is indicated at 80 in each of FIGS. 4 and 5. An adjustable belt tensioner 116 rides against belt 114. The upper cam unit 60 is shown in FIG. 4 in ghost outline only but is driven in similar fashion to cam unit 62. Thus, unit 60 has a vertical drive shaft 118 that is rotatable about an axis 120 parallel to the two axes 80 and 98. A pulley 122 on the lower end of shaft 118 is driven by a toothed belt 124 from a further toothed pulley 126 at the upper end of shaft 96. An adjustable tensioner for belt 124 is visible in part at 128 in each of FIGS. 2 and 3.

It can be seen from each of FIGS. 2 and 3 that the upper cam unit 60 is mounted on a fixed bracket 130 that is bolted to the frame of the projector. The lower cam unit 62 on the other hand is mounted on a bracket 132 secured to a support arm 134 that is pivotally mounted on the cam unit drive shaft by a sleeve 135 rotationally supported on housing 100. This allows the arm 134, and with it cam unit 62 to be swung about the axis of shaft 96 for movement between a normal operative position of the cam unit as shown in FIG. 5, and an inoperative position in which the cam unit is swung outwardly clear of the upper cam unit for permitting maintenance and servicing of the cam unit itself. As best shown in FIG. 5, the cam unit can be locked in its operative position by means of a locking bolt 136 that extends through a projection 138 on arm 134 and into a complimentarily screw-threaded recess in the projective frame.

It will of course be understood that the preceding description relates to a particular preferred embodiment of the invention only and that many modifications are possible within the broad scope of the invention. For example, while the particular arrangement shown and described for supporting and driving the cam units is preferred, other possibilities exist. For example, each cam unit could be individually driven by its own synchronous drive motor and the lower cam unit could be pivotally supported on an arm coupled directly to the frame of the projector.

The two rolling loop mechanisms of the projector will normally be identical except in the area of the cam units as discussed previously. For example, the two rotors will normally be identical in all respects (e.g. diameter, axial size, gap number and configuration, shutter number and configuration). However, within the broad concept of the invention the two mechanisms could be different provided the projected images were arranged to be coincident on the projection screen.

It should further be noted that, while specific reference has been made to a projector for use in "alternate eye" projection this is not essential. Images could be projected simultaneously from both film strips and the images is coded, for example by means of polarizing filters as discussed previously.

I claim:

1. A 3-D motion picture projector for projecting corresponding series of "left eye" and "right eye" images from respective film strips, the projector comprising:

first and second rolling loop film transport mechanisms for the respective said film strips, each mechanism including stator means having an aperture, a rotor co-operating with the stator means to define a film passage, the rotor having gaps for receiving film loops and being rotatable with respect to the stator means, means for moving the relevant film strip through said passage, means for locating said film strip in registration with said aperture, and film deceleration means comprising a cam unit having means for releasably engaging a said film strip to decelerate said film for engagement with said film locating means, said cam unit having a vertical rotational axis; said first and second rolling loop film transport mechanisms being located in vertically superposed relationship with said rotors rotatable about a common vertical axis;

means for projecting light through each of said apertures;

a projection lens assembly in association with each said aperture; and, means supporting the lower one of said cam units for movement between an operative position for decelerating film in the lower of said rolling loop film transport mechanisms, and an inoperative position in which the lower cam unit is clear of the upper cam unit for permitting access to the lower cam unit.

2. A projector as claimed in claim 1, further comprising:

cam unit drive means including a rotary drive shaft having a vertical axis located parallel to the rotational axes of the respective cam units and outwardly of the stator means of the respective rolling loop mechanisms, and coupling means between the drive shaft and the respective cam units for driving the cam units from said shaft;

said support means for the lower cam unit being pivotally mounted on said cam unit drive shaft so that the lower cam unit can be swung outwardly about said shaft from said operative position to said inoperative position; and, means for locking said lower ca unit in its said operative position for operation of the projector.

3. A projector as claimed in claim 2, wherein said coupling means between the drive shaft of the cam unit drive means and each said cam unit comprises a toothed endless belt encircling respective toothed pulleys on said drive shaft and cam unit respectively, whereby the driving connection between the drive shaft and lower cam unit is maintained when said cam unit is moved to its inoperative position and cam timing is retained when the cam unit is returned to its operative position.

4. A projector as claimed in claim 2, further comprising a housing for said rotary drive shaft of the cam unit drive means, said housing being mounted on a fixed part of the projector, and bearing means rotationally supporting the drive shaft within said housing; and wherein said support means for the lower cam unit comprises a sleeve coupled to said housing for turning movement about said vertical axis of the rotary drive shaft, and an arm extending outwardly from said sleeve and supporting said lower cam unit, whereby said lower cam unit is pivotally mounted on the drive shaft.

5. A projector as claimed in claim 2, wherein said means for locking said lower cam unit in its said operative position comprise a bolt on said arm engageable with a complimentarily screw-threaded bore in a fixed part of the projector, whereby the arm can be bolted in a position maintaining said lower cam unit in its said operative position.

6. A projector as claimed in claim 1, wherein said cam unit comprises a housing, a cam supported in said housing for rotation about said vertical rotational axis, the cam having a cam track in an upper face thereof, a cam follower engaged in said cam track, a crank arm having first and second limbs and pivotally coupled to said housing intermediate said limbs, said cam follower being located at an end of one of said limbs, and film registration pins projecting outwardly from the outer end of the other said limb and forming said mean for releasably engaging the film strip.

7. A projector as claimed in claim 1, wherein said means for moving the film strip through said film passage comprises film inlet and outlet sprockets adjacent respectively opposite ends of the film passage for each said rolling loop transport mechanism, and wherein the two inlet sprockets of the respective mechanisms and the two outlet sprockets of the respective mechanisms are vertically aligned with one another and provided with respective common drive shafts.

8. A projector as claimed in claim 1, further comprising a common lens mount supporting the projection lens assemblies associated with both said rolling loop transport mechanisms.

9. A 3-D motion picture projector for projecting alternate images from corresponding series of "left eye" and "right eye" images on respective film strips, the projector comprising:

first and second rolling loop film transport mechanisms for the respective said film strips, each mechanism including stator means having an aperture, a rotor co-operating with the stator means to define a film passage, the rotor having gaps for receiving film loops and being rotatable with respect to the stator means, means for moving the relevant film strip through said passage, means for locating said film strip in registration with said aperture, and film deceleration means comprising a cam unit having means for releasably engaging a said film strip to decelerate said film for engagement with said film locating means, said cam unit having a vertical rotational axis; said first and second rolling loop film transport mechanisms being located in vertically superposed relationship with said rotors rotatable about a common vertical axis but angularly offset from one another to an extent sufficient to achieve alternate projection of the images from the respective film strips;

means for projecting light through each of said apertures; and, a projection lens assembly in association with each said apparatus.

10. A projector as claimed in claim 9, wherein the two rotors are identical and each rotor has a plurality of equally spaced gaps and is provided with a primary shutter at each gap and a flicker shutter midway between each successive pair of gaps, and wherein the two rotors are angularly offset by an amount equal to one quarter of the spacing between successive said gaps.

* * * * *